United States Patent [19]  
Taylor

[11] 4,343,628  
[45] Aug. 10, 1982

[54] FLUORINATED DIAMOND BONDED IN FLUOROCARBON RESIN

[75] Inventor: Gene W. Taylor, Los Alamos, N. Mex.

[73] Assignee: The United States of America as represented by the United States Department of Energy, Washington, D.C.

[21] Appl. No.: 228,837

[22] Filed: Jan. 27, 1981

[51] Int. Cl.³ ............................................. C08K 3/16
[52] U.S. Cl. ...................................................... 51/298
[58] Field of Search .......................................... 51/298

[56] References Cited

U.S. PATENT DOCUMENTS 3,317,354  5/1967  Darrow et al. ...................... 148/1.5
3,711,595  1/1973  Margave et al. .................... 423/446
3,904,501  9/1975  Lagon et al. ........................ 204/164

OTHER PUBLICATIONS

J. E. Field, The Properties of Diamonds, pp. 231–233, 321, 352, 370–372, 596–603, Academic Press 1979, Du Pont Teflon FEP Data Sheets.
Cadman et al., Identification of Functional Groups on the Surface of a Fluorinated Diamond Crystal by Photoelectron Spectroscopy, J.C.S. Chem. Comm., 1975, pp. 654–655.

Primary Examiner—James H. Derrington
Attorney, Agent, or Firm—Edward C. Walterscheid; Paul D. Gaetjens; Richard G. Besha

[57] ABSTRACT

By fluorinating diamond grit, the grit may be readily bonded into a fluorocarbon resin matrix. The matrix is formed by simple hot pressing techniques. Diamond grinding wheels may advantageously be manufactured using such a matrix. Teflon fluorocarbon resins are particularly well suited for using in forming the matrix.

17 Claims, No Drawings

FLUORINATED DIAMOND BONDED IN FLUOROCARBON RESIN

The U.S. Government has rights in this invention pursuant to Contract W-7405-ENG-36 between the U.S. Department of Energy and the University of California (41 C.F.R.§9-9.109-6(i)(5)(ii)(B)).

BACKGROUND OF THE INVENTION

The invention described herein relates to a method of bonding diamonds in a support matrix and articles of manufacture formed from the resulting matrices. More particularly, it relates to a method of first fluorinating the diamonds and then bonding said fluorinated diamonds in a matrix of a desired material such as a fluorocarbon resin.

Diamond is the most versatile abrasive material known. Diamond dust or grit of varying sizes is used extensively in industry for grinding, sawing, drilling, honing, dressing, lapping (preparing very smooth surfaces), and polishing. While certain of these operations, such as lapping and polishing, may readily be performed with the diamond abrasive in a loose powder form, the others typically require the diamond grit to be bonded in a matrix which in turn is formed into a tool in which the grit has geometrically undefined, i.e., random, cutting edges. The matrices are typically formed of resins or metal claddings.

The term "bonded" is somewhat of a misnomer when applied to diamonds. The surface of a diamond is smooth and dense and does not readily form adhesive bonds. This is generally true of all of the hard, refractory solids. As a consequence, there is a tendency in present resin bonded matrices for the diamond grit to pull free and also at heavy grit loadings for the matrices to crack and separate at high stresses. These problems are avoided by metal laminated matrices which, however, are quite expensive compared to resin matrices.

Accordingly, it is an object of the present invention to provide a method of bonding diamonds in a support matrix.

Another object of the invention is to provide articles of manufacture produced from diamonds bonded in a support matrix.

A further object of the invention is to provide resin bonded diamond grinding wheels which are less susceptible to cracking and separating under heavy stress loads.

Still another object of the invention is to provide a method of bonding diamonds in a support matrix by standard hot pressing techniques.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In its broad aspect, the invention encompasses a method of bonding diamond to a desired material which comprises first fluorinating the surface of the diamond and then bonding the desired material to the fluorinated surface of the diamond. In a preferred embodiment the diamond is in the form of diamond grit which is distributed through the matrix of a fluorocarbon resin such as a copolymer of perfluoroethylene-propylene. The fluorinated diamond grit is slurry mixed with the copolymer in a desired ratio, and the mixture is then dried to remove all liquids. By hot pressing the dried mixture at an appropriate temperature and pressure, a continuous matrix of the copolymer is readily formed to which the fluorinated diamond grit is bonded.

The invention also encompasses articles of manufacture made in accordance with the method of the invention. The articles thus made are advantageous over those of the prior art resin bonded diamond articles in that the bond is better and the articles are capable of undergoing quite high stress loadings without separating or cracking. These advantages are particularly significant in the manufacture of diamond grinding wheels. Finally, the invention permits well-known fluorocarbon resins of the type sold under the tradename of TEFLON to be used as the binding matrix.

DETAILED DESCRIPTION OF THE PREFERRED EMBODIMENT OF THE INVENTION

It is known that diamond surfaces which have been cleaned by low energy (600 V) $Ar^+$ ion bombardment can readily be saturated with chemisorbed fluorine by exposing them to F atoms generated by microwave-discharged $SF_6$ vapor at low pressure ($10^{-3}$ torr). A monolayer of covalently bonded fluoride forms within a few minutes. The fluorinated surfaces contain $\equiv CF$, $=CF_2$, and $-CF_3$ groups. After 20 minutes exposure under the conditions noted, these groups were present in the following respective percentages: 61, 30, and 9%.

A fluorinated diamond surface formed in this manner has certain of the characteristics of the fluorocarbon resins sold under the trademark TEFLON by E. I. du Pont de Nemours and Co. Because of this fact fluorinated diamonds are more readily bonded to a polymeric material than are nonfluorinated diamonds. This is especially true if the polymeric material is itself fluorinated. Thus, fluorocarbon resins such as TEFLON are particularly well suited for use in the practice of the present invention.

The preferred fluorocarbon resin is TEFLON FEP which is a copolymer of tetrafluoroethylene ($CF_2=CF_2$) and hexafluoropropylene ($CF_2=CF-CF_3$) having the general chain formula

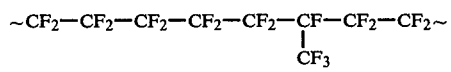

It will be apparent that the ratio of tetrafluoroethylene to hexafluoropropylene may be varied in the copolymer. The preferred ratio is that in the resin sold as TEFLON 120 FEP.

In the preferred embodiment, industrial diamond dust or grit of a desired grit size is treated in a mild (0.5–1 torr) argon or helium microwave discharge (~75 W, 1350 MHz) for about 1 hour. The grit is stirred at 15 minute intervals to make certain that the various surfaces are exposed to the Ar or He plasma. The diamond grit thus treated is then fluorinated using a 4:1 ratio of argon or helium to $SF_6$ under the same microwave discharge conditions for 0.5 to 1 hour with occasional stirring. Although $SF_6$ is the preferred source of fluorine atoms, any fluorinated compound which produces fluorine atoms in the microwave discharge, as, for example, $CF_4$ or $BF_3$, is suitable for use, provided only that any other discharge product does not coat out on the diamond grit and thereby adversely affect the fluorination.

An aqueous dispersion or emulsion of TEFLON 120 FEP is mixed with the fluorinated diamond grit to form a paste. The amount of TEFLON 120 FEP is not critical, provided only that it is present in an amount sufficient to act as an effective binder for the diamond grit when hot pressed. Amounts ranging from less than 10 vol.% to 30 vol.% have been used. An amount of toluene sufficient to "break" the emulsion is then stirred into the paste. Typically, a few milliliters is sufficient for this purpose. The mixture is then slurried with an excess of acetone until foaming stops. The grit is allowed to settle and the acetone is decanted.

Finally, the wet mixture remaining is dried under vacuum at 250° C. This serves to volatilize and remove the wetting agents used in forming the TEFLON 120 FEP emulsion as well as the water in which the emulsion is formed. The very small beads of TEFLON 120 FEP which were dispersed in the emulsion adhere to the fluorinated diamond grit by electrostatic attraction. As a consequence, in the resultant dried powder, each bit of diamond grit is surrounded by such beads. It is this dried powder which can be readily hot pressed to form a matrix in a desired shape of fluorocarbon resin in which the fluorinated diamond grit is substantially uniformly dispersed and bonded.

Thus, for example, in the manufacture of a grinding wheel in accordance with the invention, a soft aluminum cylinder is centered in a hardened steel die of a desired diameter, and the dried powder is poured around the aluminum cylinder. The powder and cylinder are pressed at 20 kpsia and 325° C. Under these conditions the TEFLON 120 FEP melts to form a continuous matrix in which the fluorinated diamond grit is heat bonded. At the same time, the aluminum cylinder is deformed into a plate or hub having the matrix strongly bonded to its outer diameter. The aluminum plate or hub is then drilled out at its center to form a grinding wheel which may readily be mounted to any appropriate grinder.

The temperature and pressure given in the foregoing example are not critical. Thus, any temperature in the range of 288°–399° C. may be used. The only limitation is that the temperature be sufficient to heat bond the beads of TEFLON 120 FEP to each other and to the fluorinated diamond grit but not sufficiently high to degrade the resulting matrix. Likewise, the pressure is only required to be sufficient to adequately compact the powder and deform the central cylinder sufficiently to form the desired wheel.

The foregoing description of preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use of the invention as set forth herein. This description sets forth the best mode presently contemplated for the practice of the invention. Finally, it is intended that the scope of the invention be defined by the claims appended hereto.

What I claim is:

1. An article of manufacture which comprises fluorinated diamond bonded in fluorocarbon resin.

2. An article according to claim 1 wherein said article of manufacture comprises a formed support matrix of fluorocarbon resin in which fluorinated diamond is bonded.

3. An article according to claim 2 wherein said diamond comprises diamond grit which is distributed substantially uniformly through a continuous matrix of said fluorocarbon resin.

4. An article according to claim 1, 2, or 3 wherein the diamond-loaded matrix is bonded to a desired metal.

5. An article according to claim 4 wherein said fluorocarbon resin is a perfluoroethylene-propylene copolymer.

6. An article according to claim 5 wherein said fluorocarbon resin is a copolymer of tetrafluoroethylene and hexafluoropropylene having the general chain formula

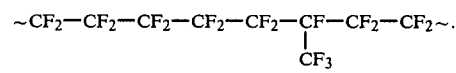

7. The article of claim 6 wherein said copolymer comprises 10 vol.% or less of the article.

8. An abrasive composition of matter which comprises fluorinated diamond grit bonded to a matrix of a copolymer of perfluoroethylene-propylene.

9. An abrasive grinding wheel which comprises fluorinated diamond grit bonded to a matrix of a fluorinated resin with said matrix bonded to a metallic hub.

10. The wheel of claim 9 wherein said fluorocarbon resin is a perfluoroethylene-propylene copolymer.

11. The wheel of claim 10 wherein said hub is formed of aluminum.

12. A method of bonding diamond to a fluorocarbon resin, said method comprising (a) fluorinating said diamond, (b) mixing said fluorinated diamond and said fluorocarbon resin to form a mixture, and (c) heat bonding said fluorocarbon resin to the fluorinated surface of said diamond by hot pressing said mixture at a temperature and pressure sufficient to produce a continuous matrix of said fluorocarbon resin in which said fluorinated diamond is bonded but not high enough to degrade said fluorocarbon resin.

13. A method according to claim 12 wherein said diamond to be fluorinated is diamond grit and said fluorinated diamond grit is distributed substantially uniformly through a matrix of fluorocarbon resin.

14. A method according to claim 13 wherein said fluorocarbon resin is a perfluoroethylene-propylene copolymer.

15. A method according to claim 14 wherein said fluorocarbon resin is a copolymer of tetrafluoroethylene and hexafluoropropylene having the general chain formula

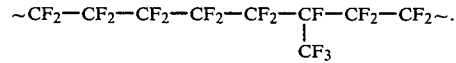

16. A method of bonding diamond grit to a perfluoroethylene-propylene copolymer so as to distribute said diamond grit substantially uniformly through a matrix of perfluoroethylene-propylene copolymer, said method comprising:
(a) fluorinating said diamond grit, and
(b) bonding said perfluoroethylene-propylene copolymer to the fluorinated surfaces of said diamond grit by
 (1) slurry mixing an aqueous emulsion of said perfluoroethylene-propylene copolymer with said fluorinated diamond grit in a desired ratio so as to form a mixture,
 (2) then drying said mixture to remove all liquids, thus forming a dried mixture, and
 (3) hot pressing said dried mixture at a temperature and pressure sufficient to produce a continuous matrix of said perfluoroethylene-propylene copolymer to which said fluorinated diamond grit is bonded.

17. A method according to claim 16 wherein said mixture is hot pressed at a temperature of about 325° C.

* * * * *